US008654714B2

(12) United States Patent
Kishiyama et al.

(10) Patent No.: US 8,654,714 B2
(45) Date of Patent: Feb. 18, 2014

(54) BASE STATION AND USER DEVICE (75) Inventors: Yoshihisa Kishiyama, Yokosuka (JP);
Kenichi Higuchi, Yokohama (JP);
Mamoru Sawahashi, Yokohama (JP)

(73) Assignee: NTT DoCoMo. Inc., Tokyo (JP)

( * ) Notice: Subject to any disclaimer, the term of this patent is extended or adjusted under 35 U.S.C. 154(b) by 570 days.

(21) Appl. No.: 12/525,487

(22) PCT Filed: Jan. 28, 2008

(86) PCT No.: PCT/JP2008/051217
§ 371 (c)(1),
(2), (4) Date: Oct. 13, 2009

(87) PCT Pub. No.: WO2008/096626
PCT Pub. Date: Aug. 14, 2008

(65) Prior Publication Data
US 2010/0085925 A1    Apr. 8, 2010

(30) Foreign Application Priority Data

Feb. 5, 2007    (JP) .................................. 2007-026184

(51) Int. Cl.
*H04W 4/00*    (2009.01)
(52) U.S. Cl.
USPC .......................................... 370/329; 370/328
(58) Field of Classification Search
USPC ........................................................ 370/329
See application file for complete search history.

(56) References Cited

PUBLICATIONS

Catt, "E-UTRA Downlink Control Signaling Design," 3GPP TSG RAN WG1 LTE Ad Hoc, R1-061838; Cannes, France, Jun. 27-30, 2006, 4 pages.
NTT DoCoMo, et al., "Reference Signal Structure for MIMO in E-UTRA Downlink," 3GPP TSG RAN WG1 Meeting #46bis, R1-062725; Seoul, Korea, Oct. 9-13, 2006, 9 pages.
NTT DoCoMo, et al., "Dedicated Reference Signal for Beam-forming in E-UTRA Downlink," 3GPP TSG RAN WG1 Meeting #47bis, R1-070089; Sorrento, Italy, Jan. 15-19, 2007, 3 pages.
Nortel, "Further Performance Evaluation of Downlink Transmit Diversity Schemes for 2- and 4-Branch L1/L2 Control," 3GPP TSG-Ran Working Group 1 Meeting #47bis, R1-070455; Sorrento, Italy, Jan. 15-19, 2007, 14 pages.
3GPP TR 25.814 V7.0.0, Jun. 2006, "Physical layer aspects for evolved Universal Terrestrial Radio Access (UTRA)," 126 pages.
3GPP TS 36.211 V0.3.0, Jan. 2007, "Physical Channels and Modulation," 26 pages.
International Search Report issued in PCT/JP2008/051217, mailed on Apr. 22, 2008, with translation, 9 pages.
Written Opinion issued in PCT/JP2008/051217, mailed on Apr. 22, 2008, 3 pages.
Extended European Search Report for Application No. 08704026.7, mailed on Dec. 6, 2012 (6 pages).
NTT Docomo et al,. "Downlink L1/L2 Control Signaling Channel Structure: Mapping"; 3GPP TSG RAN WG Meeting #47bis; R1-070104, Sorrento, Italy; Jan. 15-19, 2007 (17 pages).
NTT Docomo et al., "Multiplexing Method of Downlink L1/L2 Control Channel with Shared Data Channel in E-UTRA Downlink"; 3GPP TSG RAN WG1 Meeting #47; R1-063323; Riga, Latvia; Nov. 6-10, 2006 (12 pages).

(Continued)

*Primary Examiner* — Shripal Khajuria
(74) *Attorney, Agent, or Firm* — Osha Liang LLP (57) ABSTRACT

A base station communicating with a user device using multiple antennas in a system where a subframe is composed of multiple slots each composed of multiple basic time units is disclosed. The base station includes a first mapping unit configured to map one or more reference signals used for demodulation of one or more L1/L2 control channels and one or more data channels to be transmitted from one or more of the antennas within a predetermined number of basic time units from the beginning of each subframe; and a second mapping unit configured to map reference signals used for demodulation of data channels to be transmitted from other ones of the antennas to one or more basic time units following the basic time units to which the reference signals used for demodulation of the L1/L2 control channels and the data channels are mapped.

14 Claims, 7 Drawing Sheets

BASE STATION AND USER DEVICE

TECHNICAL FIELD

The present invention generally relates to a mobile communication system employing orthogonal frequency division multiplexing (OFDM) for downlink. More particularly, the present invention relates to a base station in the mobile communication system.

BACKGROUND ART

A successor communication system to W-CDMA and HSDPA (collectively called UMTS), i.e., Long Term Evolution (LTE), is currently being discussed by 3GPP that is a standardization group for UMTS. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In LTE, the maximum transmission rate of 100 Mbps is to be supported for downlink. Also in LTE, the transmission rate is optimized for respective users moving at low speed and high speed.

Meanwhile, MIMO transmission (MIMO multiplexing), where different signals are transmitted in parallel via transmission paths formed by multiple inputs (transmitting antennas) and multiple outputs (receiving antennas), is expected to be an indispensable technology for LTE. MIMO transmission makes it possible to increase the total transmission rate by the number of parallel transmission paths even if the frequency band is unchanged.

As a radio access method for high-speed transmission at several tens of Mbps or higher, orthogonal frequency division multiplexing (OFDM) is suitable. In OFDM, orthogonal subcarriers are densely arranged such that the spectra of the subcarriers overlap each other to improve frequency efficiency. In OFDM, a signal is divided and is transmitted via multiple subcarriers. Compared with a method where a signal is transmitted via one carrier, in a transmission method using n (n is an integer greater than 0) subcarriers, the symbol length becomes n times greater.

Figure 1:
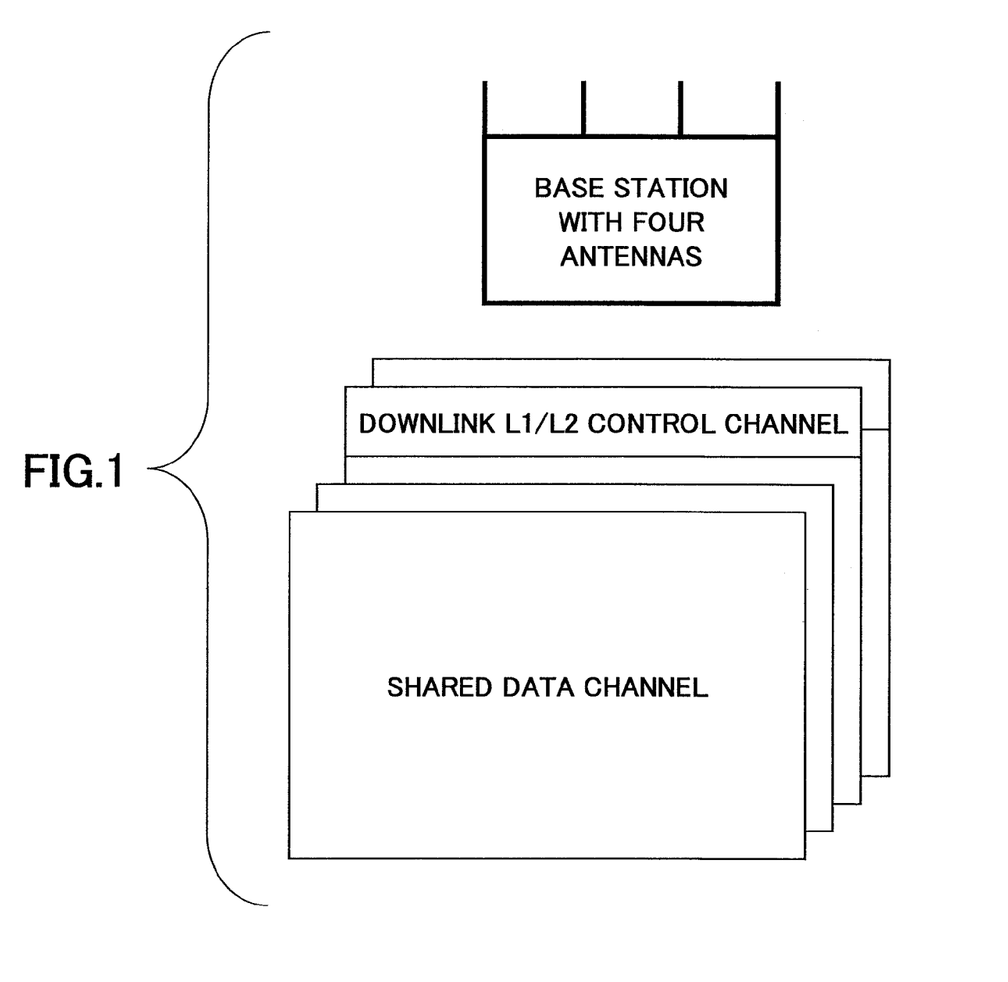
FIG. 1 is a drawing illustrating a transmission method of L1/L2 control channels and shared data channels in a base station equipped with four antennas.

For example, a transmission method as shown in FIG. 1 has been proposed. In the exemplary transmission method of FIG. 1, a base station (eNode B: eNB) equipped with four antennas transmits shared data channels (SDCH) using the four antennas and transmits L1/L2 control channels using two of the four antennas. Also, the base station transmits reference signals (RS) unique to the respective antennas from the corresponding antennas. A reference signal includes bits that are known to both the sending end and the receiving end before transmission and may also be called a known signal, a pilot signal, and a training signal.

Figure 2:
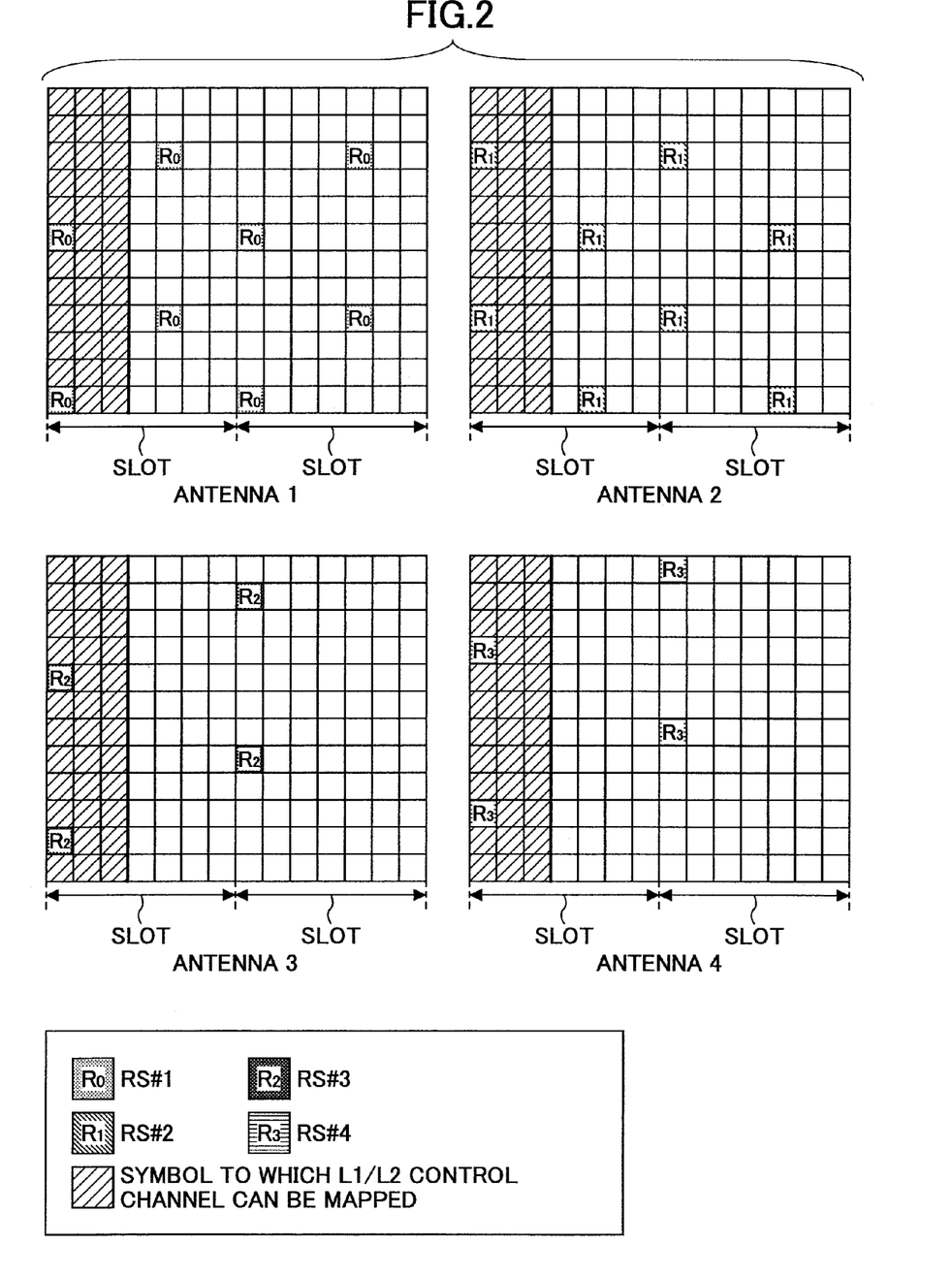
FIG. 2 is a drawing illustrating exemplary mapping of reference signals.

Also, in another proposal, the reference signals corresponding to four antennas of the base station are mapped to leading OFDM symbols in each transmission slot as shown in FIG. 2 (see, for example, 3GPP TS 36.211 (V0.3.0), January 2007).

DISCLOSURE OF INVENTION

Problems to be Solved by the Invention

However, the above background art technologies have problems as described below.

In a proposal for LTE, L1/L2 control channels are mapped within the first three symbols (OFDM symbols) in each subframe and are transmitted using two antennas of a base station. Also in a proposal, a broadcast channel (BCH), a paging channel (PCH), and a synchronization channel (SCH) are transmitted using up to two antennas.

Meanwhile, it is proposed to configure a user device to be able to receive at least an L1/L2 control channel(s) with one or two antennas. Accordingly, if reference signals corresponding to respective antennas of a base station are mapped to leading OFDM symbols, options in a demodulation process at the user device increase. That is, the user device has to try three demodulation patterns corresponding to a case where a signal is transmitted using one antenna, a case where a signal is transmitted using two antennas, and a case where a signal is transmitted using four antennas.

One object of the present invention is to solve or reduce one or more of the above problems and to provide a base station that makes it possible to reduce demodulation patterns in a reception process at a user device.

Means for Solving the Problems

An aspect of the present invention provides a base station including multiple antennas and communicating with a user device using the multiple antennas in a system where a subframe is composed of multiple slots each composed of multiple basic time units. The base station includes a first mapping unit configured to map one or more reference signals used for demodulation of one or more L1/L2 control channels and one or more data channels to be transmitted from one or more of the antennas within a predetermined number of basic time units from the beginning of each subframe; and a second mapping unit configured to map reference signals used for demodulation of data channels to be transmitted from other ones of the antennas to one or more basic time units following the basic time units to which the reference signals used for demodulation of the L1/L2 control channels and the data channels are mapped.

This configuration makes it possible to reduce options in a demodulation process at a user device.

Advantageous Effect of the Invention

An aspect of the present invention provides a base station that makes it possible to reduce demodulation patterns in a reception process at a user device.

EXPLANATION OF REFERENCES

50 Cell
$100_n$, $100_1$, $100_2$, $100_3$ User device
102 CP removing unit
104 Fast Fourier transform unit (FFT)
106 L1/L2 control channel receiving unit
108, 116, 120, 128 Switching unit
110, 122 Demultiplexing unit (DEMUX)
$112_1$, $112_2$, $124_1$, $124_2$, $124_3$, $124_4$ Channel estimating unit
114 Demodulation unit
126 Signal separation/demodulation unit
200 Base station
202, $202_1$, $202_2$, $202_3$, $202_4$ Multiplexing unit (MUX)
204, $204_1$, $204_2$, $204_3$, $204_4$ Inverse fast Fourier transform unit (IFFT)
206, $206_1$, $206_2$, $206_3$, $206_4$ Guard interval adding unit (CP)
208 Scheduler
300 Access gateway
400 Core network
1000 Radio communication system Best Mode for Carrying Out the Invention The best mode for carrying out the invention is described based on the following embodiments with reference to the accompanying drawings.

Throughout the accompanying drawings, the same reference numbers are used for parts having the same functions, and overlapping descriptions of those parts are omitted.

Figure 3:
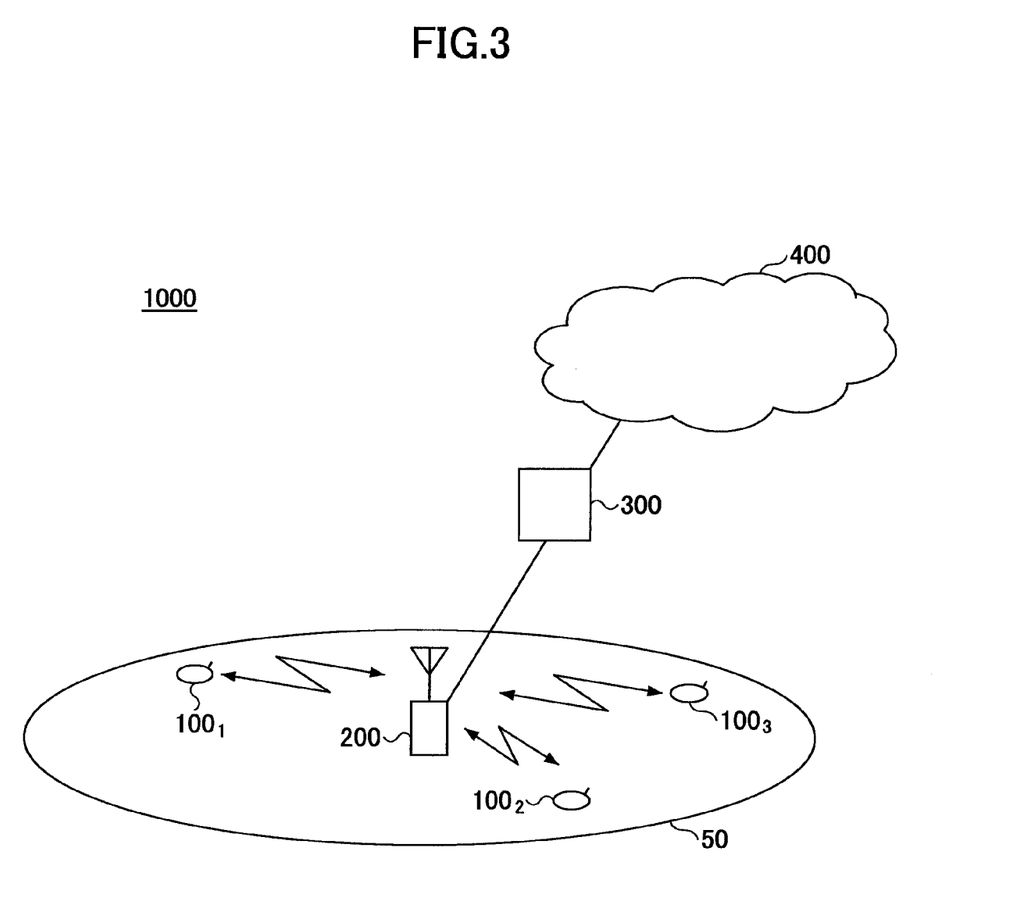
FIG. 3 is a drawing illustrating a configuration of a radio communication system according to an embodiment of the present invention.

A radio communication system 1000 including a base station according to an embodiment of the present invention is described below with reference to FIG. 3.

The radio communication system 1000 is based on, for example, Evolved UTRA and UTRAN (also called Long Term Evolution (LTE) or Super 3G). The radio communication system 1000 includes a base station (eNode B: eNB) 200 and multiple user devices (user equipment: UE) 100, ($100_1$, $100_2$, $100_3$ ... $100_n$) (n is an integer greater than 0). The base station 200 is connected to an upper node such as an access gateway 300 and the access gateway 300 is connected to a core network 400. Although only one antenna is shown in FIG. 3, the base station 200 includes multiple antennas. The user devices 100, are in a cell 50 and communicate with the base station 200 according to Evolved UTRA and UTRAN.

The user devices $100_n$ ($100_1$, $100_2$, $100_3$ ... $100_n$) have the same configuration and functions and are hereafter just called the user devices $100_n$ unless otherwise mentioned.

In the radio communication system 1000, OFDM is used as the downlink radio access method and SC-FDMA is used as the uplink radio access method. In OFDM, as described above, a frequency band is divided into narrow frequency bands (subcarriers) and data are transmitted on the subcarriers. In SC-FDMA, a frequency band is divided into frequency bands and the frequency bands are allocated to different terminals for transmission in order to reduce interference among the terminals.

Communication channels used in LTE are described below.

For downlink, a physical downlink shared channel (PDSCH) shared by the user devices $100_n$ and an LTE downlink control channel are used. In downlink, the LTE downlink control channel is used to transmit information on users to be mapped to the physical downlink shared channel, transport format information for the physical downlink shared channel, information on users to be mapped to a physical uplink shared channel, transport format information for the physical uplink shared channel, and delivery confirmation information for the physical uplink shared channel; and the physical downlink shared channel is used to transmit user data.

For uplink, the physical uplink shared channel (PUSCH) shared by the user devices $100_n$ and an LTE uplink control channel are used. There are two types of uplink control channel: an uplink control channel to be time-division-multiplexed with the physical uplink shared channel and an uplink control channel to be frequency-division-multiplexed with the physical uplink shared channel.

In uplink, the LTE uplink control channel is used to transmit downlink channel quality indicators (CQI) used for scheduling, adaptive modulation and coding (AMC), and transmission power control (TPC) of the physical downlink shared channel, and delivery confirmation information (HARQ ACK information) for the physical downlink shared channel; and the physical uplink shared channel is used to transmit user data.

Figure 4:
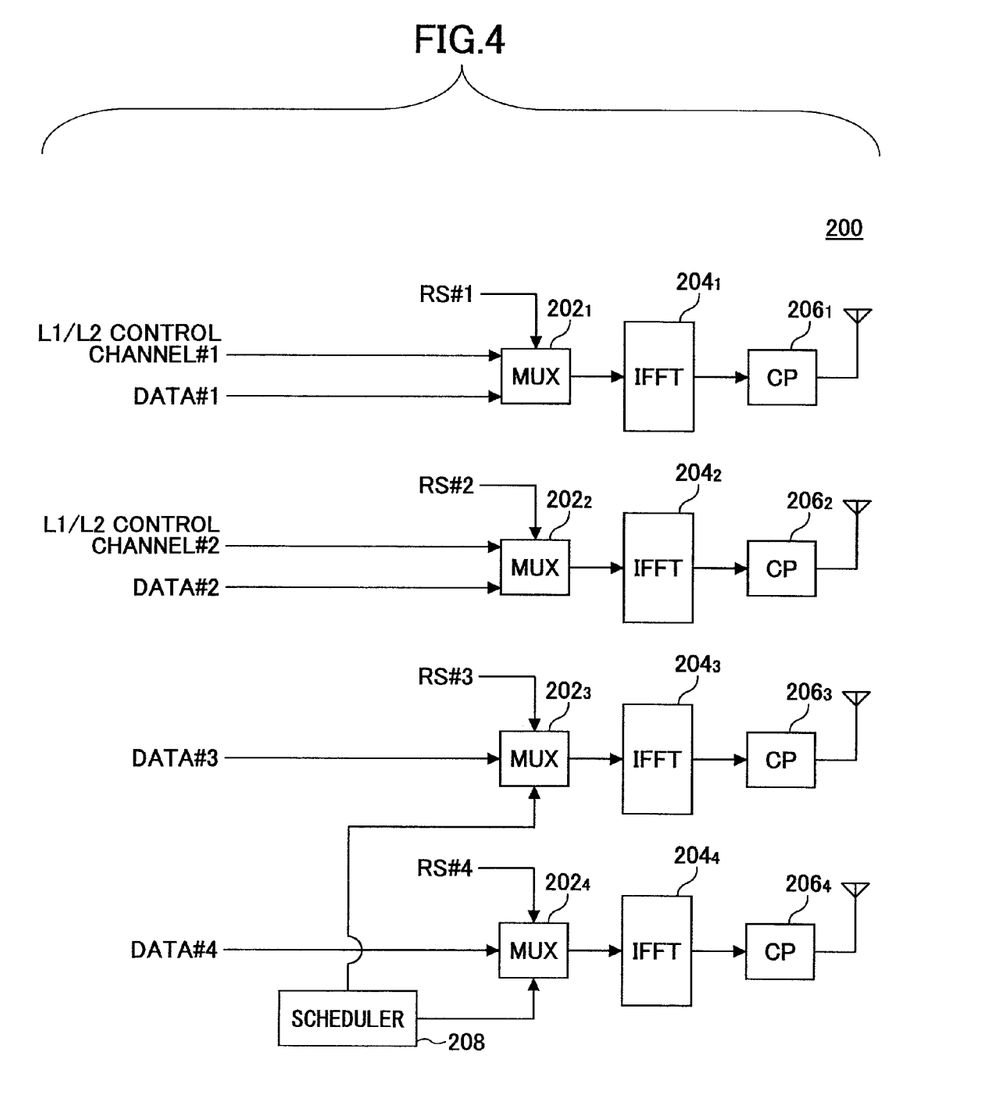
FIG. 4 is a partial block diagram of a base station according to an embodiment of the present invention.

Next, the base station 200 according to an embodiment of the present invention is described with reference to FIG. 4. In this embodiment, it is assumed that the base station 200 is equipped with four antennas. However, the present invention may also be applied to a base station equipped with more than four antennas. Also in this embodiment, it is assumed that each subframe is composed of multiple slots (e.g., two slots) and each slot is composed of multiple basic time units (e.g., seven basic time units). However, the configuration of a subframe may be changed as necessary. Further in this embodiment, a section composed of one subcarrier and one basic time unit is called a resource element.

The base station 200 of this embodiment includes multiplexing units (MUX) $202_1$, $202_2$, $202_3$, and $202_4$; inverse fast Fourier transform units (IFFT) $204_1$, $204_2$, $204_3$, and $204_4$; guard interval adding units (CP) $206_1$, $206_2$, $206_3$, and $206_4$; and a scheduler 208.

Figure 6:
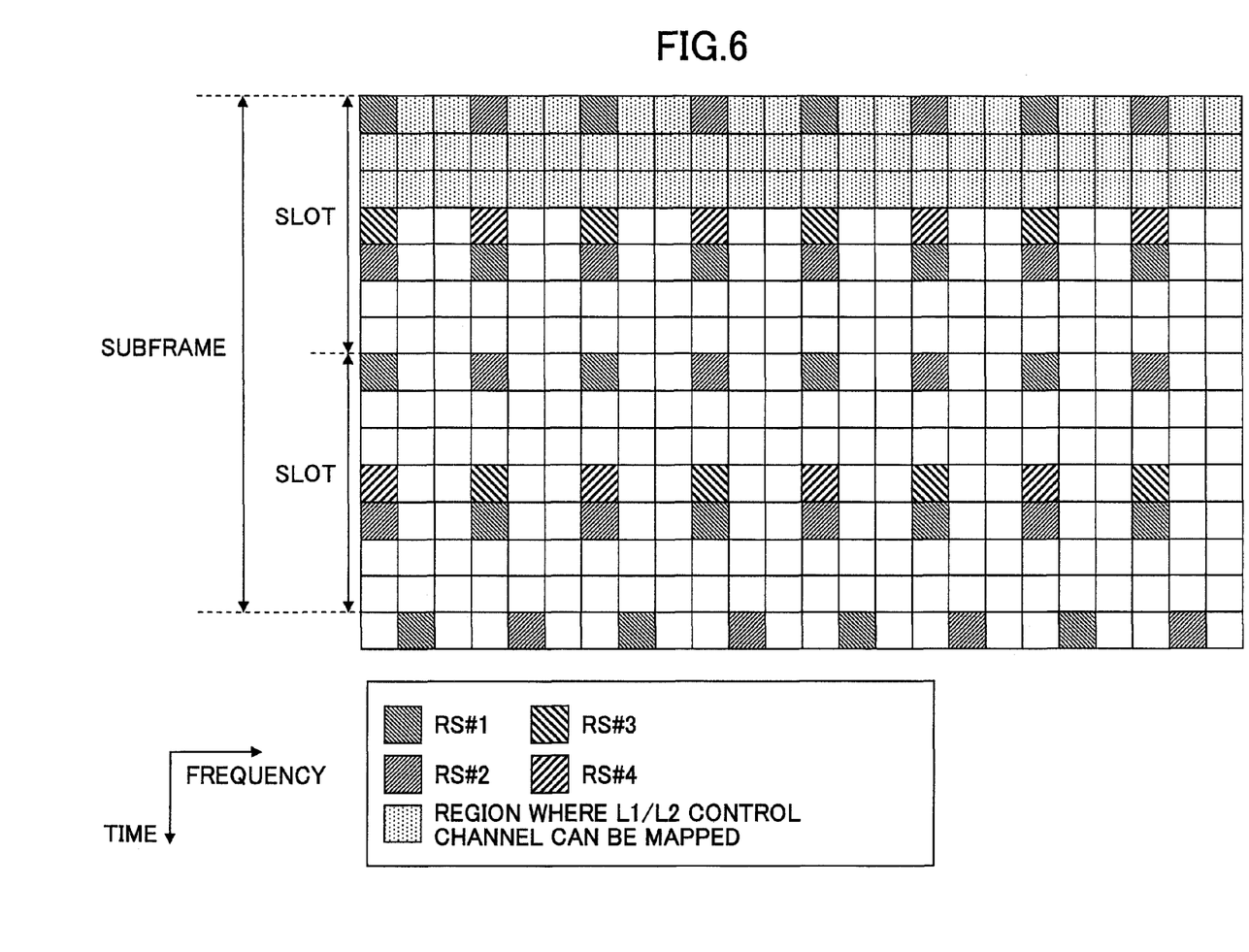
FIG. 6 is a drawing illustrating exemplary mapping of reference signals according to an embodiment of the present invention.

An L1/L2 control channel #1, a data channel such as a shared data channel #1, and a reference signal (RS) #1 to be transmitted from an antenna #1 are input to and multiplexed by the multiplexing unit $202_1$. The reference signal #1 is used to demodulate the L1/L2 control channel #1 and the data channel #1. For example, as shown in FIG. 6, the L1/L2 control channel #1 is mapped within a predetermined number of OFDM symbols from the beginning of each subframe, for example, within the first three basic time units. In other words, the L1/L2 control channel #1 is mapped to predetermined resource elements within the first three rows of resource elements from the beginning of each subframe.

The reference signal #1 is mapped within a predetermined number of OFDM symbols from the beginning of each slot, for example, within the first three basic time units. For example, the reference signal #1 is mapped to predetermined resource elements in the first row of resource elements in each slot. The reference signal #1 is also mapped to the fourth or later OFDM symbol in each slot. For example, the reference signal #1 is mapped to predetermined resource elements in the fifth row of resource elements in each slot. To improve the accuracy of channel estimation at the user devices $100_n$, the reference signal #1 to be mapped to the fourth or later OFDM symbol in each slot is preferably mapped to resource elements near the middle of each slot. For example, the reference signal #1 is preferably mapped to resource elements in the fourth or fifth row of resource elements in each slot.

The data channel #1 is mapped to resource elements other than those to which the L1/L2 control channel #1 and the reference signal #1 are mapped.

The multiplexing unit $202_1$ maps and multiplexes the L1/L2 control channel #1, the reference signal #1, and the data channel #1 and inputs the multiplexed signal to the IFFT $204_1$. The IFFT $204_1$ inverse-Fourier-transforms the multiplexed signal and modulates the multiplexed signal by OFDM.

The guard interval adding unit $206_1$ attaches guard intervals to the OFDM-modulated symbols. Then, the OFDM-modulated symbols are transmitted from the antenna #1.

An L1/L2 control channel #2, a data channel such as a shared data channel #2, and a reference signal (RS) #2 to be transmitted from an antenna #2 are input to and multiplexed by the multiplexing unit $202_2$. The reference signal #2 is used to demodulate the L1/L2 control channel #2 and the data channel #2. For example, as shown in FIG. 6, the L1/L2 control channel #2 is mapped within a predetermined number of OFDM symbols from the beginning of each subframe, for example, within the first three basic time units. In other words, the L1/L2 control channel #2 is mapped to predetermined resource elements within the first three rows of resource elements from the beginning of each subframe.

The reference signal #2 is mapped within a predetermined number of OFDM symbols from the beginning of each slot, for example, within the first three basic time units. For example, the reference signal #2 is mapped to predetermined resource elements in the first row of resource elements in each slot. The reference signal #2 is also mapped to the fourth or later OFDM symbol in each slot. For example, the reference signal #2 is mapped to predetermined resource elements in the fifth row of resource elements in each slot. To improve the accuracy of channel estimation at the user devices $100_n$, the reference signal #2 to be mapped to the fourth or later OFDM symbol in each slot is preferably mapped to resource elements near the middle of each slot. For example, the reference signal #2 is preferably mapped to resource elements in the fourth or fifth row of resource elements in each slot.

The data channel #2 is mapped to resource elements other than those to which the L1/L2 control channel #2 and the reference signal #2 are mapped.

The multiplexing unit $202_2$ maps and multiplexes the L1/L2 control channel #2, the reference signal #2, and the data channel #2 and inputs the multiplexed signal to the IFFT $204_2$. The IFFT $204_2$ inverse-Fourier-transforms the multiplexed signal and modulates the multiplexed signal by OFDM.

The guard interval adding unit $206_2$ attaches guard intervals to the OFDM-modulated symbols. Then, the OFDM-modulated symbols are transmitted from the antenna #2.

A data channel such as a shared data channel #3 and a reference signal (RS) #3 to be transmitted from an antenna #3 are input to and multiplexed by the multiplexing unit $202_3$. The reference signal #3 is used to demodulate the data channel #3. For example, as shown in FIG. 6, the reference signal #3 is mapped, in each slot, to a basic time unit following the basic time units to which the L1/L2 control channels #1 and #2 and the reference signals #1 and #2 are mapped by the multiplexing units $202_1$ and $202_2$. In other words, the reference signal #3 is mapped to the fourth or later OFDM symbol or basic time unit in each slot, i.e., in a region other than that where the L1/L2 control channels are mapped. For example, the reference signal #3 is mapped to predetermined resource elements in the fourth row of resource elements in each slot. To improve the accuracy of channel estimation at the user devices $100_n$, the reference signal #3 to be mapped to the fourth or later basic time unit in each slot is preferably mapped to resource elements near the middle of each slot. For example, the reference signal #3 is preferably mapped to resource elements in the fourth or fifth row of resource elements in each slot.

The data channel #3 is mapped to resource elements other than those to which the reference signal #3 is mapped.

The multiplexing unit $202_3$ maps and multiplexes the reference signal #3 and the data channel #3 and inputs the multiplexed signal to the IFFT $204_3$. The IFFT $204_3$ inverse-Fourier-transforms the multiplexed signal and modulates the multiplexed signal by OFDM.

The guard interval adding unit $206_3$ attaches guard intervals to the OFDM-modulated symbols. Then, the OFDM-modulated symbols are transmitted from the antenna #3.

A data channel such as a shared data channel #4 and a reference signal (RS) #4 to be transmitted from an antenna #4 are input to and multiplexed by the multiplexing unit $202_4$. The reference signal #4 is used to demodulate the data channel #4. For example, as shown in FIG. 6, the reference signal #4 is mapped, in each slot, to a basic time unit following the basic time units to which the L1/l2 control channels #1 and #2 and the reference signals #1 and #2 are mapped by the multiplexing units $202_1$ and $202_2$.

In other words, the reference signal #4 is mapped to the fourth or later OFDM symbol or basic time unit in each slot, i.e., in a region other than that where the L1/L2 control channels are mapped. For example, the reference signal #4 is mapped to predetermined resource elements in the fourth row of resource elements in each slot. To improve the accuracy of channel estimation at the user devices $100_n$, the reference signal #4 to be mapped to the fourth or later basic time unit in each slot is preferably mapped to resource elements near the middle of each slot. For example, the reference signal #4 is preferably mapped to resource elements in the fourth or fifth row of resource elements in each slot.

The data channel #4 is mapped to resource elements other than those to which the reference signal #4 is mapped.

The multiplexing unit $202_4$ maps and multiplexes the reference signal #4 and the data channel #4 and inputs the multiplexed signal to the IFFT $204_4$. The IFFT $204_4$ inverse-Fourier-transforms the multiplexed signal and modulates the multiplexed signal by OFDM.

The guard interval adding unit $206_4$ attaches guard intervals to the OFDM-modulated symbols. Then, the OFDM-modulated symbols are transmitted from the antenna #4.

The scheduler 208 performs scheduling of the reference signals #3 and #4 and thereby causes the multiplexing units $202_3$ and $202_4$ to map, in each slot, the reference signals #3 and #4 to resource elements in a region other than that where the L1/L2 control channels are mapped. For example, the scheduler 208 maps the reference signals #3 and #4 to the fourth or later OFDM symbol in each slot.

Each of the multiplexing units $202_1$, $202_2$, $202_3$, and $202_4$ may be configured to change resource elements to which the L1/L2 control channel and/or the reference signal is mapped at a predetermined interval, for example, every subframe. For example, each of the multiplexing units $202_1$, $202_2$, $202_3$, and $202_4$ may be configured to cause the L1/L2 control channel and/or the reference signal to "hop" from previous resource elements to adjacent resource elements, i.e., to map the L1/L2 control channel and/or the reference signal to the adjacent resource elements in the next subframe.

Figure 7:
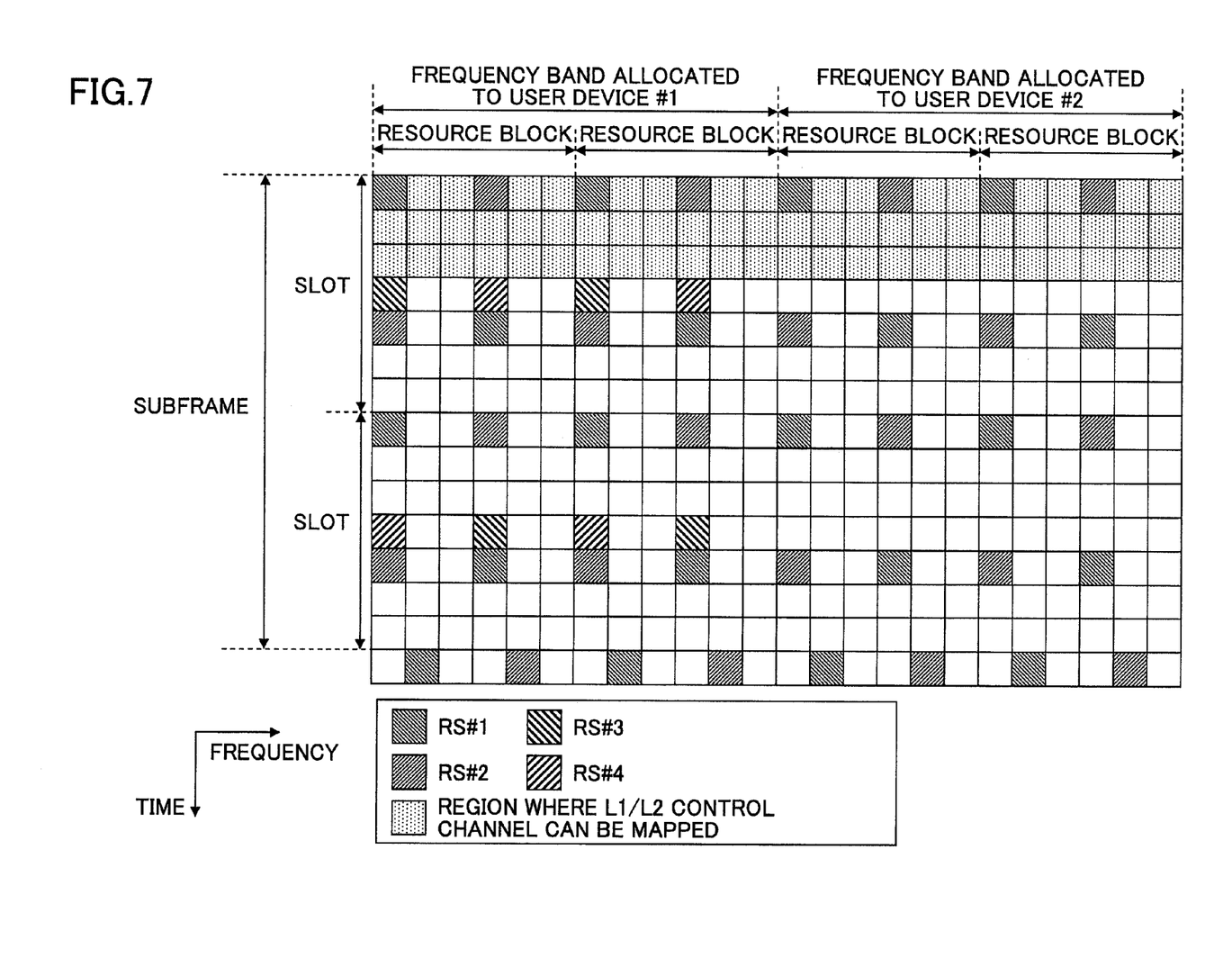
FIG. 7 is a drawing illustrating other exemplary mapping of reference signals according to an embodiment of the present invention.

Also, the multiplexing units $202_3$ and $202_4$ may be configured to determine, resource block by resource block, whether to map the reference signals #3 and #4 to basic time units following the basic time units to which the L1/l2 control channels #1 and #2 and the reference signals #1 and #2 are mapped by the multiplexing units $202_1$ and $202_2$ according to the numbers of antennas of the respective user devices $100_n$. In the example shown in FIG. 7, the reference signals #1, #2, #3, and #4 are mapped to resource elements in resource blocks allocated to a user device #1 equipped with four antennas and the reference signals #1 and #2 are mapped to resource elements in resource blocks allocated to a user device #2 equipped with two antennas.

Figure 5:
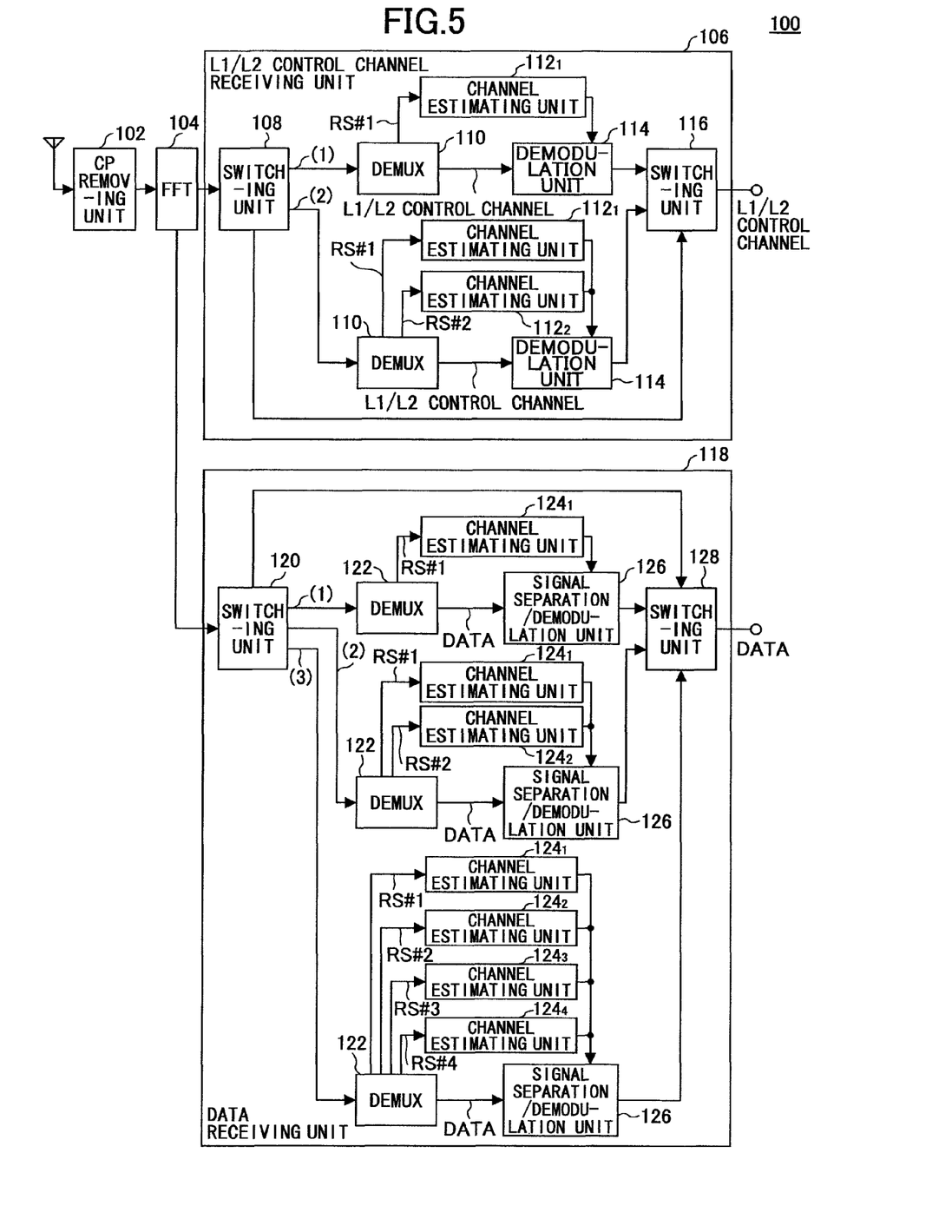
FIG. 5 is a partial block diagram of a user device according to an embodiment of the present invention.

Next, the user device 100 (generally refers to any one of the user devices $100_n$) of this embodiment is described with reference to FIG. 5.

The user device 100 of this embodiment includes a CP removing unit 102, a fast Fourier transform unit (FFT) 104, an L1/L2 control channel receiving unit 106, and a data receiving unit 118.

The L1/L2 control channel receiving unit 106 includes switching units 108 and 116, demultiplexing units (DEMUX) 110, channel estimating units $112_1$ and $112_2$, and demodulation units 114.

The data receiving unit 118 includes switching units 120 and 128, demultiplexing units (DEMUX) 122, channel estimating units $124_1$, $124_2$, $124_3$, and $124_4$, and signal separation/demodulation units 126.

The CP removing unit 102 removes guard intervals from received symbols and thereby extracts effective symbols from the received symbols.

The fast Fourier transform unit (FFT) 104 fast-Fourier-transforms an input signal and inputs the fast-Fourier-transformed signal to the switching unit 108 or 120. The FFT 104 inputs an L1/L2 control channel to the switching unit 108 and inputs a data channel to the switching unit 120.

The switching unit 108 selects a demodulation process (one-antenna demodulation process) for a signal transmitted with one antenna or a demodulation process (two-antenna demodulation process) for a signal transmitted with two antennas according to the number of antennas (one or two) used by the base station 200 to transmit the L1/L2 control channel. For example, the user device 100 reports the number of its antennas to the base station 200 during a connection process.

The base station 200 determines the number of antennas used to transmit the L1/L2 control channel based on the number of antennas reported by the user device 100. For example, the base station 200 uses one antenna for transmission if the number of antennas of the user device 100 is one or uses two antennas for transmission if the number of antennas of the user device 100 is two or more. The switching unit 108 inputs a selection result indicating which one of the one-antenna demodulation process and the two-antenna demodulation process is selected to the switching unit 116.

When the L1/L2 control channel is transmitted using one antenna from the base station 200, the fast-Fourier-transformed signal is input to the demultiplexing unit 110 (1). The demultiplexing unit 110 separates the input signal into a reference signal (RS) #1 and the L1/L2 control channel, inputs the RS #1 to the channel estimation unit $112_1$, and inputs the L1/L2 control channel to the demodulation unit 114. The channel estimation unit $112_1$ performs channel estimation based on the RS#1 and inputs the result of channel estimation to the demodulation unit 114. The demodulation unit 114 demodulates the L1/L2 control channel based on the result of channel estimation and inputs the demodulated L1/L2 control channel to the switching unit 116.

When the L1/L2 control channel(s) is transmitted using two antennas from the base station 200, the fast-Fourier-transformed signal is input to the demultiplexing unit 110 (2). The demultiplexing unit 110 separates the input signal into a reference signal (RS) #1, a reference signal (RS) #2, and the L1/L2 control channel(s), inputs the RS #1 and the RS#2 to the channel estimation units $112_1$ and $112_2$, and inputs the L1/L2 control channel(s) to the demodulation unit 114. The channel estimation unit $112_1$ performs channel estimation based on the RS#1 and the channel estimation unit $112_2$ performs channel estimation based on the RS#2. The results of channel estimation are input to the demodulation unit 114. The demodulation unit 114 separates the L1/L2 control channel(s) into L1/L2 control channels transmitted from the respective antennas, demodulates the L1/L2 control channels based on the corresponding results of channel estimation, and inputs the demodulated L1/L2 control channels to the switching unit 116.

The switching unit 116, according to the selection result input from the switching unit 108, outputs either the L1/L2 control channel demodulated by the one-antenna demodulation process or the L1/L2 control channels of the respective antennas demodulated by the two-antenna demodulation process.

The switching unit 120 selects a demodulation process (one-antenna demodulation process) for a signal transmitted with one antenna, a demodulation process (two-antenna demodulation process) for a signal transmitted with two antennas, or a demodulation process (four-antenna demodulation process) for a signal transmitted with four antennas according to the number of antennas used by the base station 200 to transmit a data channel(s). Also, the switching unit 120 inputs a selection result indicating which one of the one-antenna demodulation process, the two-antenna demodulation process, or the four-antenna demodulation process is selected to the switching unit 128.

When the data channel is transmitted using one antenna from the base station 200, the fast-Fourier-transformed signal is input to the demultiplexing unit 122 (1). The demultiplexing unit 122 separates the input signal into a reference signal (RS) #1 and the data channel, inputs the RS #1 to the channel estimation unit $124_1$, and inputs the data channel to the signal separation/demodulation unit 126. The channel estimation unit $124_1$ performs channel estimation based on the RS#1 and inputs the result of channel estimation to the signal separation/demodulation unit 126. The signal separation/demodulation unit 126 demodulates the data channel based on the result of channel estimation and inputs the demodulated data channel to the switching unit 128.

When the data channel(s) is transmitted using two antennas from the base station 200, the fast-Fourier-transformed signal is input to the demultiplexing unit 122 (2). The demultiplexing unit 122 separates the input signal into a reference signal (RS) #1, a reference signal (RS) #2, and the data channel(s), inputs the RS #1 to the channel estimation unit $124_1$, inputs the RS#2 to the channel estimation unit $124_2$, and inputs the data channel(s) to the signal separation/demodulation unit 126. The channel estimation unit $124_1$ performs channel estimation based on the RS#1 and inputs the result of channel estimation to the signal separation/demodulation unit 126. The channel estimation unit $124_2$ performs channel estimation based on the RS#2 and inputs the result of channel estimation to the signal separation/demodulation unit 126. The signal separation/demodulation unit 126 separates the data channel(s) into data channels transmitted from the respective antennas, demodulates the data channels based on the corresponding results of channel estimation, and inputs the demodulated data channels to the switching unit 128.

When the data channel(s) is transmitted using four antennas from the base station 200, the fast-Fourier-transformed signal is input to the demultiplexing unit 122 (3). The demultiplexing unit 122 separates the input signal into reference signals (RS) #1, #2, #3, and #4 and the data channel(s), inputs the RS #1 to the channel estimation unit $124_1$, inputs the RS#2 to the channel estimation unit $124_2$, inputs the RS#3 to the channel estimation unit $124_3$, inputs the RS#4 to the channel estimation unit $124_4$, and inputs the data channel(s) to the signal separation/demodulation unit 126.

The channel estimation unit $124_1$ performs channel estimation based on the RS#1 and inputs the result of channel estimation to the signal separation/demodulation unit 126. The channel estimation unit $124_2$ performs channel estimation based on the RS#2 and inputs the result of channel estimation to the signal separation/demodulation unit 126. The channel estimation unit $124_3$ performs channel estimation based on the RS#3 and inputs the result of channel estimation to the signal separation/demodulation unit 126. The channel estimation unit $124_4$ performs channel estimation based on the RS#4 and inputs the result of channel estimation to the signal separation/demodulation unit 126. The signal separation/demodulation unit 126 separates the data channel(s) into data channels transmitted from the respective antennas, demodulates the data channels based on the corresponding results of channel estimation, and inputs the demodulated data channels to the switching unit 128.

The switching unit 128, according to the selection result input from the switching unit 120, outputs the data channel demodulated by the one-antenna demodulation process, the data channels of the respective two antennas demodulated by the two-antenna demodulation process, or the data channels of the respective four antennas demodulated by the four-antenna demodulation process.

The above embodiment eliminates the need for a user device to try multiple demodulation patterns corresponding to different numbers of used antennas and thereby makes it possible to simplify a reception process.

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-026184 filed on Feb. 5, 2007, the entire contents of which are hereby incorporated herein by reference.

The invention claimed is:

1. A base station including a plurality of antennas and communicating with a user device using the plurality of antennas in a system where a subframe is composed of multiple slots each composed of multiple basic time units, the base station comprising:
a first mapping unit configured to map an L1/L2 control channel and a first reference signal used for demodulation of a first data channel within a predetermined number of basic time units from the beginning of each subframe, the L1/L2 control channel and the first reference signal being transmitted in a slot from a first antenna of the plurality of antennas; and
a second mapping unit configured to map a second reference signal used for demodulation of a second data channel to a basic time unit following the predetermined number of basic time units within which the L1/L2 control channel and the first reference signal are mapped, the second reference signal being transmitted in the same slot from a second antenna of the plurality of antennas.

2. The base station as claimed in claim 1,
wherein the first mapping unit is configured to map the L1/L2 control channel and the first reference signal used for demodulation of the first data channel to be transmitted from the first antenna within three basic time units from the beginning of each subframe.

3. The base station as claimed in claim 1,
wherein the second mapping unit is configured to map the second reference signal used for demodulation of the second data channel to be transmitted from the second antenna to one or more basic time units near a middle of each slot.

4. The base station as claimed in claim 1,
wherein one subcarrier and one basic time unit constitute one resource element,
wherein the first mapping unit is configured to map the L1/L2 control channel and the first reference signal used for demodulation of the first data channel to be transmitted from two of the plurality of antennas to predetermined resource elements within three basic time units from the beginning of each subframe, and
wherein the second mapping unit is configured to map the second reference signal used for demodulation of the second data channel to be transmitted from other antennas of the plurality of antennas to predetermined resource elements in the one or more basic time units following the basic time units to which the L1/L2 control channel and the first reference signal used for demodulation of and the first data channel are mapped.

5. The base station as claimed in claim 4,
wherein the first mapping unit is configured to change, at a predetermined interval, the resource elements to which the L1/L2 control channel and the first reference signal used for demodulation of the first data channel are mapped, and
wherein the second mapping unit is configured to change, at the predetermined interval, the resource elements to which the second reference signal used for demodulation of the second data channel is mapped.

6. The base station as claimed in claim 5, wherein the predetermined interval is a subframe.

7. The base station as claimed in claim 1,
wherein the second mapping unit is configured to determine, resource block by resource block, whether to map the second reference signal used for demodulation of the second data channel to be transmitted from the other antennas of the plurality of antennas to the one or more basic time units following the basic time units to which the L1/L2 control channel and the first reference signal used for demodulation of the first data channel are mapped, according to a number of antennas of the user device.

8. A user device communicating with a base station including a plurality of antennas in a system where a subframe is composed of multiple slots each composed of multiple basic time units, the user device comprising:
   a first receiving unit configured to receive a L1/L2 control channel and a first reference signal used for demodulation of a first data channel,
      wherein the L1/L2 control channel and the first reference signal are transmitted from a first antenna of the plurality of antennas of the base station and mapped within a predetermined number of basic time units from the beginning of each subframe, the L1/L2 control channel and the first reference signal being transmitted in a slot from a first antenna of the plurality of antennas; and
   a second receiving unit configured to receive a second reference signal used for demodulation of a second data channel,
      wherein the second reference signal being transmitted from a second antenna of the plurality of antennas of the base station and mapped to one or more basic time units following the basic time units to which the L1/L2 control channel and the first reference signal are mapped, the second reference signal being transmitted in the same slot from a second antenna of the plurality of antennas.

9. The user device as claimed in claim 8,
wherein the first receiving unit is configured to receive the L1/L2 control channel and the first reference signal that are transmitted from two of the antennas of the plurality of antennas of the base station, and mapped within three basic time units from the beginning of each subframe.

10. The user device as claimed in claim 8, wherein the second receiving unit is configured to receive the second reference signal that is mapped to one or more basic time units near a middle of each slot.

11. The user device as claimed in claim 8,
wherein one subcarrier and one basic time unit constitute one resource element,
wherein the first receiving unit is configured to receive the L1/L2 control channel and the first reference signal that are transmitted from two antennas of the plurality of antennas of the base station and mapped to predetermined resource elements within three basic time units from the beginning of each subframe, and
wherein the second receiving unit is configured to receive the second reference signal that are mapped to predetermined resource elements in the one or more basic time units following the basic time units to which the L1/L2 control channel and the first reference signal are mapped.

12. The user device as claimed in claim 11,
wherein the first receiving unit is configured to receive the L1/L2 control channel and the first reference signal mapped to the resource elements that are changed at a predetermined interval, and
wherein the second receiving unit is configured to receive the second reference signal mapped to the resource elements that are changed at the predetermined interval.

13. The user device as claimed in claim 12, wherein the predetermined interval is a subframe.

14. The user device as claimed in claim 8,
wherein the second receiving unit is configured to receive the second reference signal that is mapped, resource block by resource block, according to a number of antennas of the user device to the one or more basic time units following the basic time units to which the L1/L2 control channel and the first reference signal are mapped.

* * * * *